US006994817B2

(12) United States Patent  (10) Patent No.: US 6,994,817 B2
Calvar et al.  (45) Date of Patent:  Feb. 7, 2006

(54) PROCESS AND APPARATUS FOR THE COEXTRUSION OF RUBBER MIXTURES

(75) Inventors: Didier Calvar, Beaumont (FR); Bernard Marechal, Orleat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 308 days.

(21) Appl. No.: 10/366,529

(22) Filed: Feb. 13, 2003

(65) Prior Publication Data

US 2003/0136498 A1  Jul. 24, 2003

Related U.S. Application Data

(63) Continuation of application No. PCT/EP02/05333, filed on May 15, 2002.

(30) Foreign Application Priority Data

May 16, 2001  (FR)  ................... 01 06489

(51) Int. Cl.
  *B29C 47/06* (2006.01)
  *B29C 47/12* (2006.01)
  *B29D 30/52* (2006.01)
  *B60C 1/00* (2006.01)
  *B60C 19/08* (2006.01)

(52) U.S. Cl. ............... 264/173.1; 152/152.1; 152/209.5; 152/DIG. 2; 264/173.12; 264/173.17; 264/174.11; 425/131.1; 425/133.5; 425/380; 425/462

(58) Field of Classification Search ........... 156/244.11, 156/500, 501; 152/152.1, 209.5, DIG. 2; 264/173.1, 173.11, 173.12, 173.17, 174.11; 425/131.1, 133.5, 325, 380, 462
See application file for complete search history.

(56) References Cited

U.S. PATENT DOCUMENTS

| 2,342,576 | A | 2/1944 | Fielding |
| 4,539,169 | A | 9/1985 | Nixon et al. ................. 264/171 |
| 4,556,376 | A | 12/1985 | Sievers et al. ........... 425/133.5 |
| 5,017,118 | A | 5/1991 | Looman et al. ............. 425/133 |
| 5,227,425 | A | 7/1993 | Rauline ...................... 524/493 |

(Continued)

FOREIGN PATENT DOCUMENTS

EP  0501227  9/1992

(Continued)

OTHER PUBLICATIONS

U.S. Appl. No. 09/645,097 of Calvar et al., filed Aug. 24, 2000.

(Continued)

*Primary Examiner*—Steven D. Maki
(74) *Attorney, Agent, or Firm*—Buchanan Ingersoll PC

(57) ABSTRACT

The invention concerns a process and apparatus for the coextrusion of rubber mixtures, comprising a main extruder (1) with an extrusion head (10) having at least two flow channels (14, 15), each for a rubber mixture (A, B), the channels opening into an extrusion orifice (18) through which the two rubber mixtures (A, B) are propelled. The extrusion orifice (18) is delimited by a first wall (111) and a second wall (161). The apparatus also comprises at least one micro-extruder (2) for a third rubber mixture (C), whose extrusion head (22) is provided at its end with a nozzle (23) passing through the two flow channels (14, 15) such that the third rubber mixture (C) is inserted into each rubber mixture (A, B) upstream from the extrusion orifice (18).

9 Claims, 2 Drawing Sheets

U.S. PATENT DOCUMENTS

| | | | |
|---|---|---|---|
| 5,453,238 A | 9/1995 | Bardy | 264/174.11 |
| 5,928,679 A | 7/1999 | Ohki et al. | 425/327 |
| 6,294,119 B1 | 9/2001 | Nakamura | 264/173 |
| 6,495,081 B2 * | 12/2002 | Benatti | 264/173.17 |
| 6,746,227 B2 * | 6/2004 | Helle et al. | 425/133.5 |
| 2002/0157747 A1 * | 10/2002 | Shimada et al. | 152/209.5 |

FOREIGN PATENT DOCUMENTS

| | | |
|---|---|---|
| EP | 0658452 | 6/1995 |
| EP | 0715974 | 6/1996 |
| EP | 0753391 | 1/1997 |
| EP | 0895878 | 2/1999 |
| EP | 0925903 | 6/1999 |
| EP | 1103391 | 5/2001 |
| FR | 2759946 | 8/1998 |
| JP | 200052400 | 2/2000 |
| WO | 9838050 | 9/1998 |
| WO | 9943506 | 9/1999 |

OTHER PUBLICATIONS

Patent Abstract of Japan, Pub. No. 2000-52400, Feb. 22, 2000.

Patent Abstract of Japan, Pub. No. 11129713, May 18, 1999.

* cited by examiner

PROCESS AND APPARATUS FOR THE COEXTRUSION OF RUBBER MIXTURES

CROSS-REFERENCE TO RELATED APPLICATIONS

This is a continuation of international application No. PCT/EP02/05333 filed May 15, 2002, which was published in French on Nov. 21, 2002 as WO 02/092322 and which claims priority of French application No. 01/06489 filed May 16, 2001.

BACKGROUND OF THE INVENTION

1. Technical Field of the Invention

The present invention concerns a process for producing a tire having several mixtures comprising, as the majority filler, a non-conductive filler such as silica or mixtures filled with small proportions of carbon black, at least two of these mixtures constituting the tire tread. The invention also relates to apparatus for implementing such a process.

2. The Related Art

As environmental problems become more and more crucial, fuel economy and ways to combat the nuisances engendered by motor vehicles having become a priority, one of the objective of tire manufacturers is to produce a tire which combines very low rolling resistance, excellent grip on dry, wet, snowy or icy ground, very good wear resistance, and finally, low rolling noise.

To achieve that objective, European Patent Application EP A 501 227 (U.S. Pat. No. 5,227,425) proposes a tire having a tread that comprises silica as its main reinforcing filler. Although this solution gives the best compromise between the various very contradictory properties mentioned above, it has nevertheless been found that, depending on the vehicles, tires with a tread comprising silica as the main reinforcing filler have the disadvantage of being able to accumulate more or less high levels of static electricity formed by friction of the tire against the road while the vehicle is driving, since silica is not electrically conductive.

When certain particular conditions coexist, the static electricity so accumulated in a tire can give rise to a disagreeable electric shock for the occupant of the vehicle when he touches the body of the vehicle. Furthermore, this static electricity can hasten the ageing of the tire because of the ozone produced by the electric discharge. Depending on the nature of the ground and the vehicle, it can also cause the on-board radio to malfunction because of the interference it generates.

The problem of static electricity accumulation in a tire, and most of the disadvantages related to it, has been familiar for a very long time and had already arisen when the reinforcing filler used was carbon black.

Application EP 0 658 452 A1 describes the adaptation of long-known principles to a tire said to be modern, an adaptation that solves the main problems associated with the solutions proposed in various earlier documents and, in particular, the harmful heterogeneities introduced into the structures of tires. The solution proposed consists in inserting a strip of conductive rubber mixture or insert, preferentially extending all round the circumference of the tire and connecting the surface of the tread either to one of the crown plies, or to the carcass reinforcement, or to any other part of the tire that is a sufficiently good conductor of electricity, the necessary electrical conductivity being conferred by the presence of a suitable carbon black.

Although such a solution is perfectly viable for a tire having a tread that consists of a single non-conductive mixture, for example a tread of a passenger car tire, this is not true in the case of a tire having several layers of rubber mixtures above the carcass reinforcement and layers of rubber mixtures between the crown reinforcement and the carcass reinforcement, as is the case in any tire designed to roll with a high steady-state operating temperature, as in heavy vehicles or high-speed vehicles.

In effect, if for any reason such a tire has been provided with a non-conductive layer or internal portion of the tread (the part not in contact with the ground) between the crown reinforcement and the external portion of the tread (the part in contact with the ground) that has been made conductive by the presence of a circumferential or strip-shaped insert, the said internal portion must be made conductive. Similarly, a layer between the carcass reinforcement and the crown reinforcement, which produces the well known excess thickness in the edge areas of the crown plies, must also be made conductive if it is not so to begin with.

As described in the applicants' French application FR 97/02276 (WO 98/38050), a first solution is to ensure electrical connection between two first layers that are conductive or have been made so and are separated by a third, non-conductive layer, by means of at least one strip of rubber mixture having small thickness, width and length, positioned between the two joint faces of the third, non-conductive layer and in contact with the means that make the first two layers conductive, such that they are connected thereby. Although industrially satisfactory, this method entails the positioning of a supplementary product and leads to additional manufacturing cost.

As described in the applicants' international application WO 99/43506 (U.S. application Ser. No. 09/645,097, filed Feb. 17, 1999), a second solution consists in providing each non-conductive layer with a circumferential insert of conductive mixture after the nonconductive layer has been extruded by the usual extrusion means, and then joining the two products together before they are positioned on the crown, the said layers having a common contact surface and the width of the insert in one layer at the level of the contact surface being equal to at least 10 times that of the insert in the other layer at the same level. This method effectively enables each layer to be made electrically conductive and ensures electrical connection between them and the carcass reinforcement.

However, the method becomes too complex when there are no longer only two layers consisting of two distinct rubber mixtures, but three layers, four layers or more, with different rubber mixtures.

Besides, certain rubber mixtures have rheological properties so different that bonding them together is very difficult. This in particular is the case when one of the mixtures is more decohesive than the other. When it is desired to join such mixtures, for example within a tread, and to avoid artifices such as using a bonding agent, such as a specific glue or adhesive, to join the two, the method used is coextrusion which, moreover, has a certain economic advantage in industry. In effect, in a coextrusion process the different products, which have been worked separately by extrusion screws, are propelled towards a common extrusion orifice that allows the products to be brought together while hot and under pressure.

In this configuration, it could be envisaged to transpose the second solution to coextrusion. Thus, an insert would be produced in each product upstream from the extrusion orifice by means of two micro-extruders, the nozzle of each micro-extruder passing through each product so that, in conformity with the second solution, one of the inserts has a base at least ten times as wide as the base of the second product opposite it. However, on the one hand, such a solution considerably increases the bulk of the coextrusion machine, and on the other hand, it greatly adds to the difficulty of the operations of changing the extruded product and cleaning the extruders.

SUMMARY OF THE INVENTION

An object of the present invention is to provide coextrusion apparatus and a process that uses such apparatus, intended in particular for the production of a tire comprising at least two layers of rubber mixtures that do not conduct electricity and a circumferential insert of conductive mixture that enables the dissipation of the electric charges induced by the rolling of the tire, the apparatus and the process being as simple as possible and using just the quantity of product required to form the insert.

According to the invention, the process for obtaining an element based on rubber mixtures intended for the production of a tire is characterized in that it comprises the following steps:

using a main extruder provided with at least two extrusion screws, at least two layers of rubber mixtures are coextruded, the extrusion screws each having a respective flow channel that opens into one and the same extrusion orifice delimited by a first and a second wall; and by coextrusion through the two layers upstream from the extrusion orifice, at least one rubber mixture insert is inserted by means of a nozzle of a micro-extruder, the nozzle passing through both of the flow channels.

Adaptation of the process used to extrude a single product, which consists in direct injection at the level of the extrusion blade into the profiled mixture, to the coextrusion of two or more mixtures in this case through both flow channels, is hard to envisage for a person familiar with the field. In effect, on the one hand, this assumes that downstream from these two "insertions" at the outlet of the two flow channels the two inserts will be superposed over one another in the extrusion orifice. On the other hand, as was said earlier, coextrusion has the considerable advantage of causing adhesion between two mixtures whose rheological properties makes it difficult to produce and maintain a bond between them without recourse to the presence of other compounds. Now, in the context of coextrusion, this is made possible thanks to a variety of factors: raw adhesion, at elevated temperature and under pressure, without contact with the open air and before profiling. A priori, it seems clearly apparent that the presence of an insert that creates an interruption of the interface all along a length of the mixtures might interfere with the adhesion of the two mixtures, or result in serious bonding defects at the level of the interface between them by producing incipient detachments in the unvulcanized condition.

The applicants have discovered that, surprisingly, the inserts in the two mixtures are superposed very effectively after passage through the nozzle, and that the presence of a circumferential insert in the two mixtures and at their interface does not affect the bond between them.

The invention also relates to the apparatus for coextruding rubber mixtures, which comprises a main extruder with an extrusion head having at least two flow channels, each for a rubber mixture, the channels opening into the same extrusion orifice through which the two rubber mixtures are propelled, the extrusion orifice being delimited by a first wall and a second wall, the apparatus also comprising at least one micro-extruder for a third rubber mixture, whose extrusion head is provided at its end with a nozzle, such nozzle extending across the two flow channels so as to insert the third rubber mixture into each rubber mixture upstream from the extrusion orifice.

BRIEF DESCRIPTION OF THE DRAWINGS

Other advantages and characteristics of the invention will emerge from the following description of an exemplary embodiment of the production of a tire and of apparatus according to the invention, with reference to the attached drawings, in which.

DETAILED DESCRIPTION OF EXEMPLARY EMBODIMENTS

Figure 1:
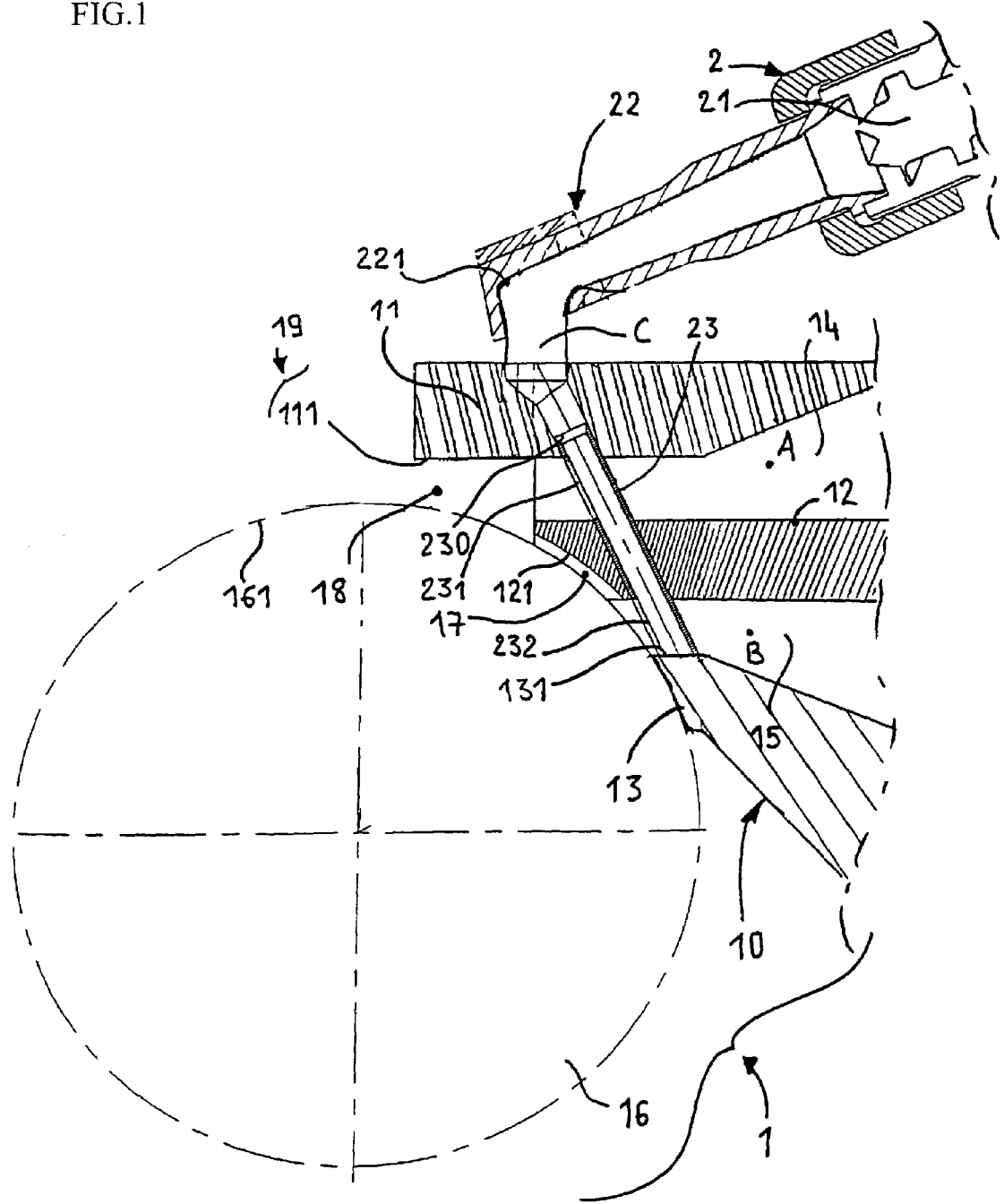
FIG. 1 is a partial longitudinal sectional view of one embodiment of the apparatus according to the invention.

FIG. 1 shows a partial view of the apparatus that enables the production of a tire tread in the unvulcanized condition, the tread comprising two coextruded layers of rubber mixtures A and B, each with an insert of a rubber mixture C produced by coextrusion together with the mixtures A and B.

Thus, FIG. 1 shows an extrusion head 10 of a first main extruder 1 that enables the coextrusion of two unvulcanized rubber mixtures A and B, intended in this example for producing the lower and upper portions of a tread.

The extrusion head 10 comprises an upper vault 11 and a lower vault 13 which, with an intermediate support 12, delimit two flow channels 14 and 15, each channel for one of the mixtures A and B.

The flow channel 15 opens into a first extrusion orifice 17 through which mixture B is propelled, delimited by a wall 121 of the support 12 and by the surface 161 of a roller 16. This extrusion orifice 17 itself opens into a second extrusion orifice 18 through which the mixture A arriving through flow channel 14 is propelled, such that the mixture B is positioned between the roller 16 and mixture A.

The extrusion orifice 18 is delimited by a first wall and a second wall consisting respectively, here, of a wall 111 carried by the vault 11, which belongs to an extrusion blade 19, and by the outer surface 161 of the roller 16. Thus, the extrusion orifice 18 allows the desired profile to be conferred upon the two coextruded mixtures.

Figure 3:
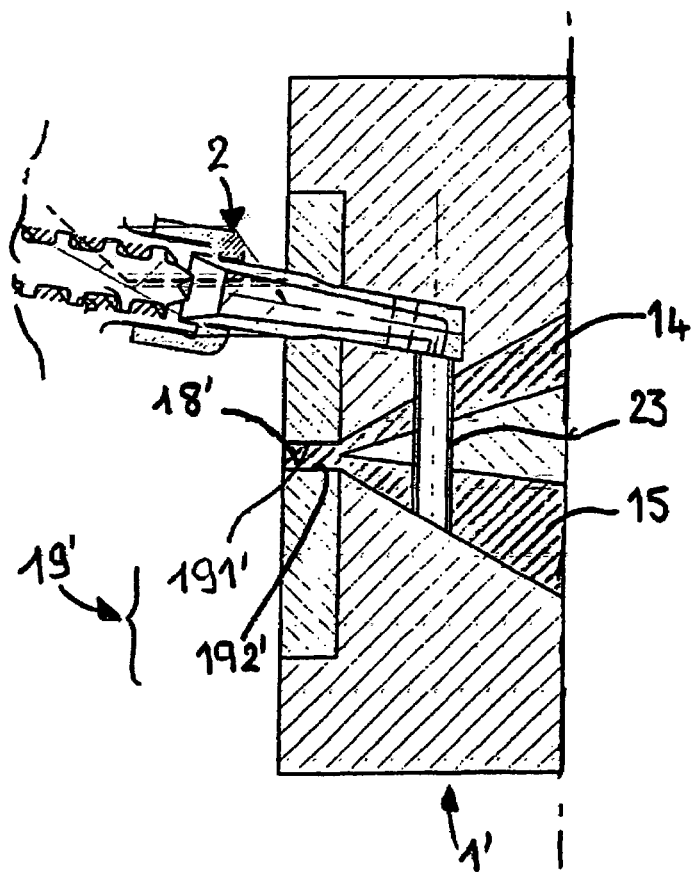
FIG. 3 is a partial longitudinal sectional view of another embodiment of the apparatus according to the invention In the following description, the same reference numbers are used to denote identical elements of the apparatus embodiments shown in FIGS. 1 and 3.

In the example chosen, the extruder is of the type known as a "roller die extruder", in which the first wall 111 of the extrusion blade 19 is fixed and the second wall is mobile and consists of the outer surface 161 of a roller associated with the extruder. However, the invention is not limited to the use of that type of extruder, and one could also envisage the use of an extruder 1' known as a "flat die extruder", in which the first and second walls consist of the two fixed walls 191' and 192' of an extrusion blade 19' as illustrated in FIG. 3. In this variant embodiment of the invention, there is only one extrusion orifice 18'.

Associated with the main extruder 1 is a very small extruder 2 commonly known as a "micro-extruder", which is mounted in a fixed position in the vault 11. The micro-extruder 2, provided with a screw 21 and an extrusion head 22, has at its end a nozzle 23 fixed to the die of the micro-extruder 2 and designed to extrude, with the profile and line desired, an insert based on a third mixture into each of the unvulcanized and hot mixtures A and B passing into the flow channels 14 and 15.

The extrusion head 22 forms a bend 221 such that the extrusion nozzle 23, fixed to the die of the extrusion head, extends across the two channels 14 and 15 and the support 12. A mixture C of conductive rubber intended to form the insert is thus extruded into each of the flows of mixtures A and B. It could also be envisaged to mount the micro-extruder 2 perpendicularly to the axis of the roller 16, and there would then be no need for a bend in the extrusion head of the micro-extruder.

The extrusion nozzle 23 used with the micro-extruder 2 has a mobile outlet passage in contact with the upper wall 131 of the vault 13 and extending across the support 12, so allowing the mixture C to pass all the way along the nozzle.

In FIG. 1, the nozzle 23 is inclined relative to the perpendicular direction at the ends of the two flow channels 14 and 15 opening towards the extrusion orifice 18. In the example described, this arrangement allows the rubber mixture C to be inserted and therefore the strip to be produced in each flow channel, close to the extrusion orifices 17 and 18 so as to avoid the risk that the strip might undergo excessive deformation between the area where it is produced and the extrusion orifice concerned. However, this arrangement must be determined as a function of a number of parameters, in particular the nature of the rubber mixtures used, the temperature and pressure conditions within the extruders, and the width and nature of the rubber mixture C. That is why, depending on these criteria, the nozzle may or may not form an angle of inclination with the direction of the flow channels and can be closer to or further away from the extrusion orifices.

The vault 11 and the support 12 receive through a bore the nozzle 23 with its mobile outlet passage which has on its cylindrical surface two slits 231, 232 formed with an appropriate cross-section along part of its height such that each slit coincides with one of the flow channels 14,15. The contact between the base of the nozzle 23 and the wall 131 of the vault 13 is maintained by the pressure of the conductive mixture acting on the section 230. According to a variant embodiment of the invention, the nozzle 23 can be fixed directly on the wall 131 of the vault 13.

This arrangement makes it possible to produce strips whose width can vary within a range of about 0.1 mm to 2 mm without the need to vary the width at the level of the bases of the two layers of rubber mixtures that are to be in contact. However, it is entirely possible to envisage forms of slits other than those described here as a non-limiting example. Moreover, with this device the mixture C can, if desired, be extruded discontinuously, depending on the applications intended, for example to produce a strip consisting of "dots".

The bulk of such equipment is therefore only very slightly increased by the presence of the micro-extruder. Moreover, the use of just one nozzle for both channels facilitates mixture changes, since it suffices to ensure that the nozzle is effectively empty to make such a change. It is easy to understand that several inserts can be made by providing several possible fixing positions in the flow channels, which could be used in succession or simultaneously according to the realization desired, with the aid of an appropriate number of micro-extruders. The shape of the slits formed in the nozzle can also be varied as desired.

Similarly, it has been chosen to describe the production of a tread having two layers of rubber mixtures A and B, but the invention also applies to the production of treads with more than two layers of coextruded mixtures.

Figure 2:
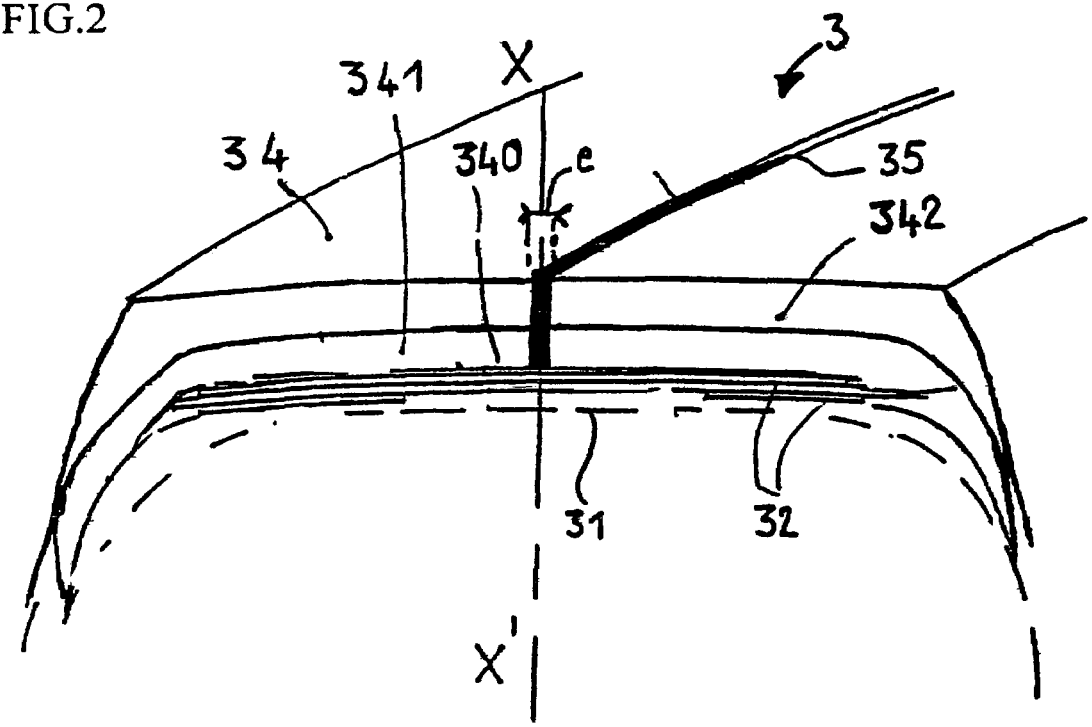
FIG. 2 is a schematic perspective representation of the crown portion of a tire according to the invention.

The apparatus described above thus makes it possible, according to the invention, in particular to produce a tread consisting of two non-conductive mixtures A and B crossed by an insert of a conductive mixture C, for a tire such as that represented in FIG. 2.

According to FIG. 2, the tire 3 of size 315/80.R.22.5, designed to have low rolling resistance, comprises a carcass reinforcement 31 consisting of a metallic ply formed of inextensible metallic cables embedded in a rubber lining mixture, which is rendered conductive to electrostatic charges by virtue of a carbon black currently used as a reinforcing filler in mixtures.

The carcass reinforcement 31 is covered at its crown by a crown reinforcement 32 consisting, in the example described, of plies and/or half-plies formed of metallic cables. All the cables of the crown reinforcement 32 are embedded in one or more rubber lining mixture(s) conductive to electrostatic charges thanks to a carbon black currently used as a reinforcing filler in mixtures.

The internal and external layers 341, 342 of the tread 34 are rendered conductive by a rubber insert 35 or strip in the form of a circumferential ring extending throughout the height of the two layers 341 and 342, to connect the surface of the tread 34 that comes into contact with the ground to the radially outermost ply of the crown reinforcement 32, formed of metallic cables embedded in a conductive rubber mixture filled with a usual carbon black. The insert 35, which has a very small axial width e on the surface of the tread, for example equal to 0.5 mm, is in the case described a single one and is theoretically centered on the equatorial plane XX' of the tire. Its trace on the contact surface 340 between the inner layer 341 and the radially outermost ply of the crown reinforcement 32 is a straight line and circular. The insert 35 could be off-center, particularly in the case when a central groove is present in the tread; there could also be two inserts, positioned symmetrically with respect to the equatorial plane for example, or even more, but in any case positioned axially in such manner that contact with the ground can be established however worn the tread may be. It can also be envisaged that the insert is a circumferentially continuous or discontinuous ring.

The rubber composition constituting the conductive connection for electrostatic charges, i.e., the insert 35, is based on a natural rubber and/or synthetic rubbers customarily used for making tires and especially treads, and having as the reinforcing filler a conductive carbon black, preferably one customarily used in tire production.

Without going beyond the scope of the invention, it is clear that the coextrusion process and equipment according to the invention can be used to position inserts in rubber mixtures without regard to conductivity, as for example to put one or more colored inserts in black rubber mixtures.

Although the invention has been described herein by reference to specific embodiments thereof, it will be understood that such embodiments are illustrative only and are susceptible of modification and variation with departing from the inventive concepts disclosed. All such modifications and variations, therefore, are intended to be encompassed within the spirit and scope of the appended claims.

What is claimed is:

1. A process for obtaining an element based on rubber mixtures, intended for the production of a tire, comprising the steps of:

using a main extruder provided with at least two extrusion screws, coextruding at least two layers of rubber mixtures (A, B), said extrusion screws each having a respective flow channel opening into an extrusion orifice delimited by a first wall and a second wall where the two layers are joined together; and before the two layers contact each other, coextruding through the two layers into each of the flow channels and upstream from the extrusion orifice, at least one insert of a rubber mixture (C) by means of a nozzle of a micro-extruder, said nozzle passing through the two flow channels.

2. The process according to claim 1, in which the layers of rubber mixture constitute parts of a tire tread.

3. The process according to claim 2, in which the rubber mixtures (A, B) constituting the parts of the tread are non-conductors of electricity, and the rubber mixture (C) extruded by the micro-extruder is electrically conductive.

4. Apparatus for coextruding rubber mixtures, comprising:

a main extruder with an extrusion head having at least two flow channels, each for a respective rubber mixture (A, B), said channels opening into an extrusion orifice through which the two rubber mixtures are propelled; the extrusion orifice being delimited by a first wall and a second wall;

a micro-extruder for a third rubber mixture (C), said micro-extruder having an extrusion head provided at its end with a nozzle passing through the two flow channels of the main extruder, such that the third rubber mixture (C) is inserted into each rubber mixture (A, B) upstream from the extrusion orifice and before the rubber mixtures (A, B) contact one another and are propelled through the extrusion orifice.

5. The apparatus according to claim 4, in which the first and second walls of the extrusion orifice comprise the two fixed walls of an extrusion blade.

6. The apparatus according to claim 4, in which the first wall delimiting the extrusion orifice is fixed and the second wall delimiting the extrusion orifice comprises the outer surface of a roller mounted on the main extruder.

7. The apparatus according to claim 4, in which the extrusion nozzle has a mobile outlet passage, has two slits coinciding with respective flow channels along part of its height, and is inserted in a bore in the main extruder.

8. The apparatus according to claim 7, in which the base of the nozzle is kept in contact with a wall of one of the flow channels by the pressure of the mixture (C) extruded by the micro-extruder.

9. The apparatus according to claim 7, in which the base of the nozzle is fixed on a wall of one of the flow channels.

* * * * *